Sept. 15, 1942.  R. H. PHELPS  2,295,913
AUTOMOTIVE SUSPENSION
Filed July 3, 1940  2 Sheets-Sheet 1
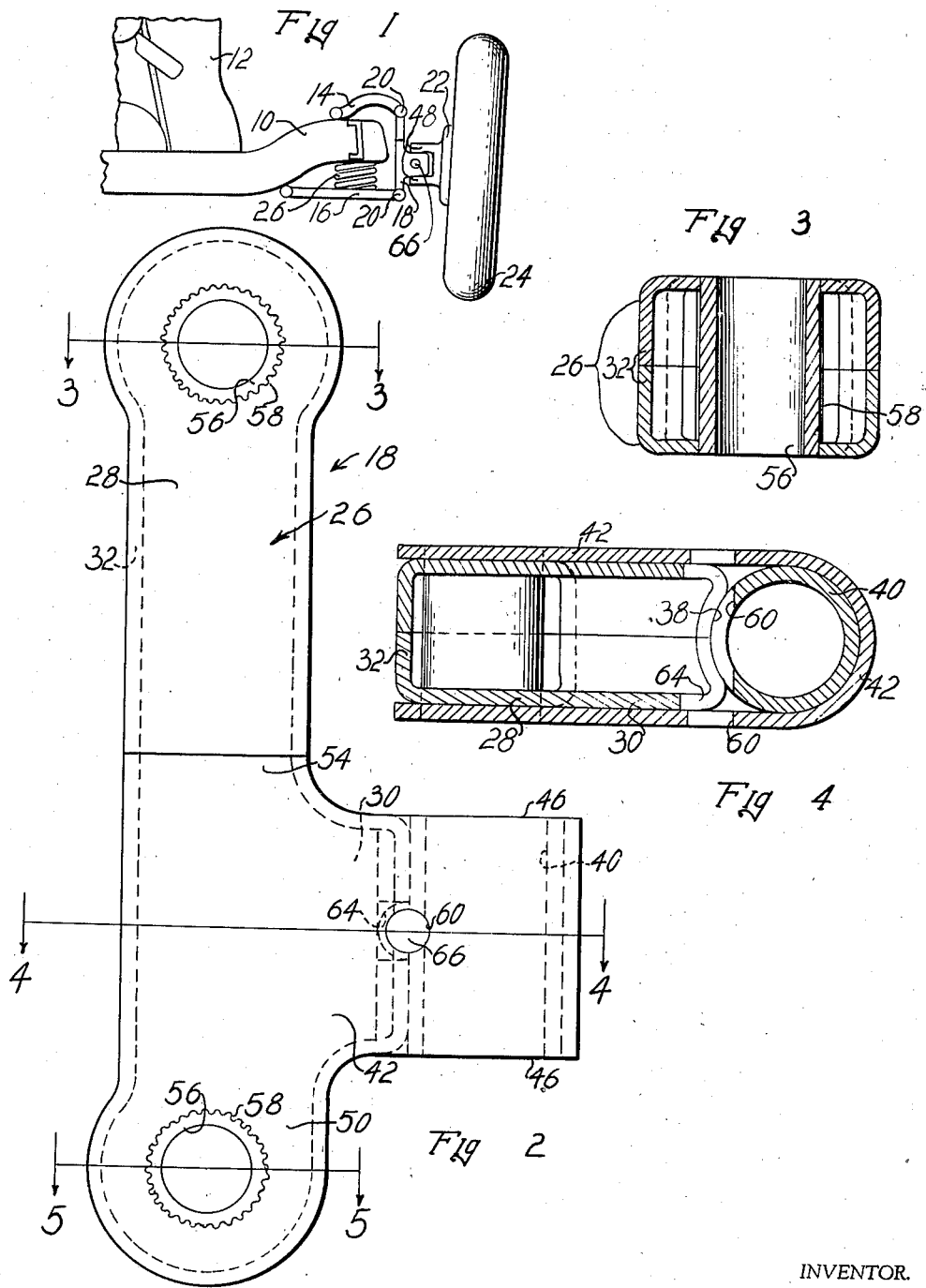
INVENTOR.
ROSS H. PHELPS
BY
ATTORNEY.

Sept. 15, 1942.　　　　R. H. PHELPS　　　　2,295,913
AUTOMOTIVE SUSPENSION
Filed July 3, 1940　　　　2 Sheets-Sheet 2
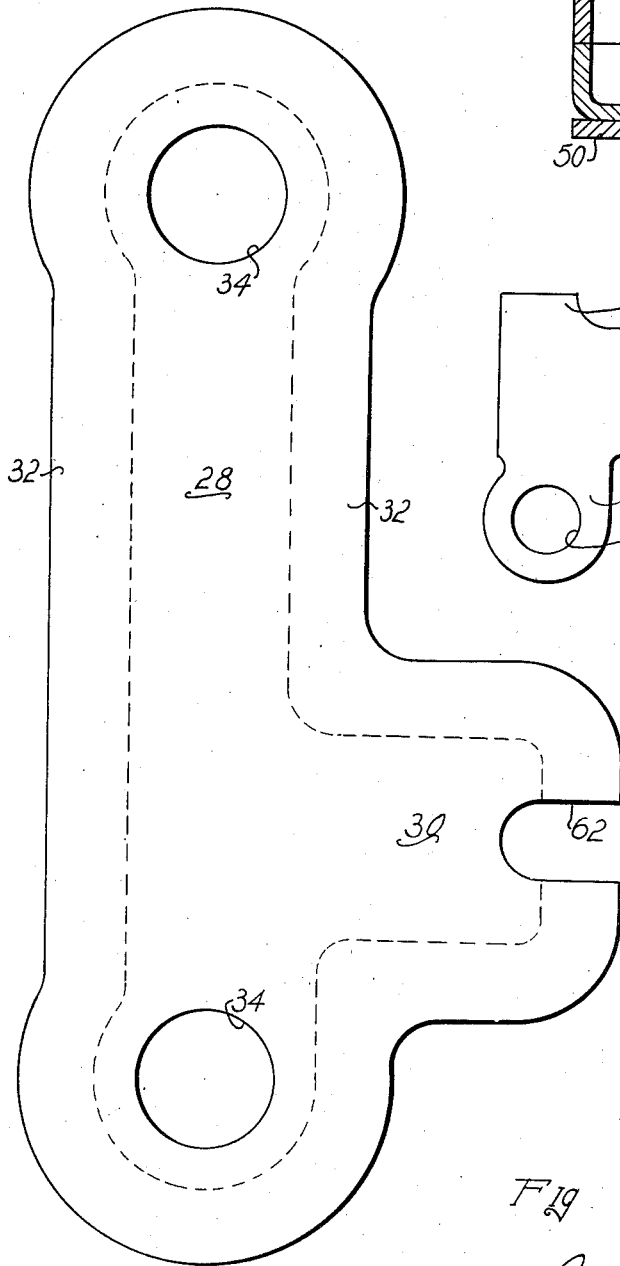
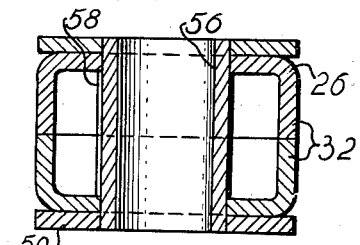
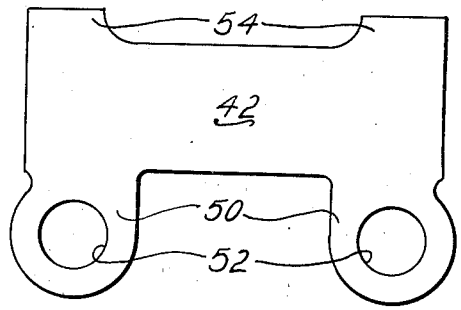
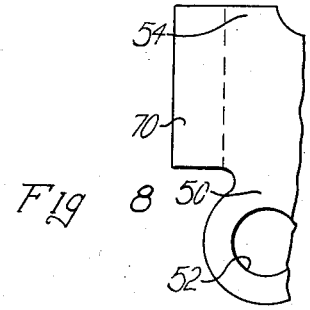
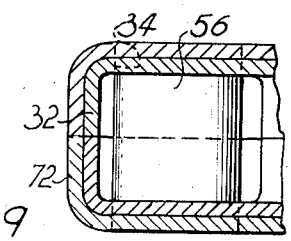
INVENTOR.
ROSS H. PHELPS
BY Carl J. Barbee
ATTORNEY.

Patented Sept. 15, 1942

2,295,913

UNITED STATES PATENT OFFICE 2,295,913

AUTOMOTIVE SUSPENSION

Ross H. Phelps, Kenosha, Wis., assignor to Nash-Kelvinator Corporation, Kenosha, Wis., a corporation of Maryland Application July 3, 1940, Serial No. 343,774

16 Claims. (Cl. 280—96.1)

This invention relates to parallel arm suspensions and has particular reference to the steering knuckle support arm of that type of suspension.

It is an object of this invention to reduce the unsprung weight of a wheel suspension system.

It is an other object of this invention to reduce the cost of manufacture of a wheel suspension system.

It is another object of this invention to substitute metal stampings for forgings in a steering knuckle support arm.

It is another object of this invention to provide novel means for retaining a king pin in a stamped steering knuckle support arm.

Other objects and advantages of this invention will be apparent from a consideration of the following description and claims and the attached drawings of which there are two sheets and in which—

Figure 1 represents a front elevation of a portion of an automobile frame and engine with a parallel arm suspension fixed thereon;

Figure 2 represents a front elevation of the steering knuckle support arm shown in Figure 1;

Figure 3 represents a sectional view taken along a plane indicated by the line 3—3 in Figure 2 and looking in the direction of the arrows;

Figure 4 represents a sectional view taken along a plane indicated by the line 4—4 in Figure 2 and looking in the direction of the arrows;

Figure 5 represents a sectional view taken along a plane indicated by the line 5—5 in Figure 2 and looking in the direction of the arrows;

Figure 6 represents a view of a stamped blank from which one half of the steering knuckle support arm is fashioned;

Figure 7 represents a stamped blank from which a reinforcing saddle is fashioned;

Figure 8 represents a modified blank similar to that shown in Figure 7; and,

Figure 9 is a sectional view similar to a portion of Figure 4 and showing the modified saddle of Figure 8 in place.

Shown in Figure 1 is an automobile having a frame 10 on which are mounted the engine 12 and the upper and lower control arms 14 and 16 respectively. The outer ends of the control arms 14 and 16 are connected to the steering knuckle support arm 18 by the pivots 20. Steering knuckle support arm 18 rotatively supports the steering knuckle 22 on which is mounted the wheel 24. Coil spring 26 positioned between the frame 10 and lower control arm 16 cushions the frame and automobile from shocks caused by the wheel passing over rough ground.

Support arm 18 is made up of two complementary stampings 26, each having a body portion 28 and a bracket portion 30 with a flange 32 pressed down completely around the body and bracket portions. The flanges 32 of the two stampings 26 are welded together along their edges to form on arm of hollow cross section. The body portions 28 are enlarged at each end and punched to form the holes 34 (see Figure 6).

The flanges 32 are deformed at the end of the bracket portion 30 to form a vertically disposed, partially cylindrical surface as at 38, which cylindrical surface forms a seat for a tubular sleeve 40 which may be welded thereto (see Figure 4). Sleeve 40 is retained against the surface 38 by a saddle plate 42 (see Figure 7) which extends around the sleeve 40 and along the sides of the bracket portions 30 and body portions 28 of the arm 18. The saddle 42 is welded to the arm 18 and sleeve 40, and the ends of the sleeve 40 and edges of the saddle 42 are ground off flat and parallel at 46 to receive the yoke arms 48 of the steering knuckle 22. The saddle 42 is provided with ears 50 which extend downwardly along the enlarged lower ends of the body portions 28. The ears 50 are apertured at 52 to form holes which are aligned with the lower holes 34 in the body portions 28. The saddle 42 is also extended upwardly at 54 for a short distance along the body portions 28 of the arm 18.

Pressed into the holes 34 at the top of the arm 18 and through the holes 52 in the ears 50 and holes 34 at the bottom of the arm 18 are two hollow bushings 56. Bushings 56 are provided with hardened external serrations 58 which displace metal at the apices of the serrations from the walls forming holes 34 and 52 as they are pressed into the arm 18 and cause such metal to flow into the depressed portions of the serrations. Bushings 56 serve to reinforce the ends of the arm 18 and receive the pivot pins 20 which hold the arm 18 to the control arms 14 and 16. The uneven surface of the bushings 56 locks the bushings in the arms 18 while the ends of the bushings take compressive forces caused by clamping the control arms 14 and 16 and the pins 20 to the support arm 18.

After the two stampings 26, sleeve 40 and saddle 42 have been joined together, a hole 60 is drilled through the saddle 42 and the side of the sleeve 40. It will be noted that the bracket portions 30 of the stampings 26 are provided with a slot 62 (see Figure 6) so that after bending, the bracket portion 30 of the arm 18 is provided with a notch 64. Notch 64 is slightly larger than the diameter of hole 60 so that the tool for drilling the hole will not touch the bracket portion 30.

Sleeve 40 is arranged to receive a king pin (not shown) and hole 60 receives the locking pin 66 (see Figures 1 and 2) which engages a flat portion on the side of the king pin to retain the king pin in place in a manner well known to the art. Yoke means 48 of the steering knuckle 22 are apertured to receive and be rotatively supported on the ends of the king pin.

Arm 18 is thus of rigid hollow construction which makes it lighter than a forging. The loads of the wheel are taken by the sleeve 40 and saddle 42 and distributed over a considerable portion of the arm 18 and by the ears 50 of the saddle 42 directly to the lower bushing 56 so that there is no localized stress in the arm 18.

Illustrated in Figures 8 and 9 is a modified type of construction in which the ends of the saddle are lengthened as at 70 (see Figure 8) and are folded around the inside edge of the arm as at 72 in Figure 9. Increasing the length of the saddle 42 in this manner further increases the strength of the assembly and distributes the wheel loads over a greater portion of the arm 18.

While I have described my invention in some detail, I intend this description to be an example only and not as a limitation of my invention to which I make the following claims:

1. A support arm for a parallel arm type wheel suspension comprising a body portion of box-shaped cross section defining parallel apertures at each end thereof extending transversely of said box-shaped cross section, the width of said cross section being increased along a portion of the length of said body portion intermediate of the ends thereof to form a bracket portion extending from one side of said body portion for supporting a king pin.

2. A support arm for a wheel suspension comprising a box-section body portion having apertured end portions, said box-section being formed by two channel-shaped stampings having channel portions facing one another and welded along the legs thereof to form said box-section, and an extension from said box section intermediate the apertured ends.

3. A support arm for a parallel arm type wheel suspension comprising two complementary stampings having their edges welded together and bushings pressed into each end of said stampings, said bushings having serrations formed on the outside thereof.

4. A support arm for a wheel suspension comprising a body portion of box-shaped cross section, and a sleeve secured to one side of said body portion and arranged to receive a king pin.

5. A support arm for a wheel suspension comprising a box-section body portion having apertured end portions, said box-section being formed by two channel-shaped stampings having channel portions facing one another and welded along the legs thereof to form said box section, an extension from said box section intermediate the apertured ends, a king pin supporting sleeve secured against said extension, and a strap extending around said sleeve and secured thereto and to the sides of said box-section.

6. A support arm for a wheel suspension comprising a body portion of box-shaped cross section, a sleeve secured along the outside of said body portion, and a reenforcing strap around said sleeve and body portion and welded thereto.

7. A support arm for a wheel suspension comprising a body portion of box-shaped cross section, a sleeve secured to one side of said body portion, and a reenforcing strap around said sleeve and body portion and welded thereto, the ends of said sleeve and the edges of said re-enforcing strap adjacent said sleeve being finished in parallel planes.

8. A support arm comprising a body portion of hollow cross section, a bracket portion of hollow cross section formed on said body portion, said bracket having a generally vertical partially cylindrical surface, a sleeve positioned in said partially cylindrical surface, and a saddle member positioned around said sleeve, bracket portion, and body portion and welded thereto.

9. A support arm comprising a pair of oppositely formed stampings, bracket portions on said stampings, flanges turned over on all sides of said stampings and bracket portions, the edges of said flanges being welded together, bushings pressed through the ends of said arms, and a sleeve secured on the end of said bracket portions.

10. A support arm comprising a pair of oppositely formed stampings, bracket portions on said stampings, flanges turned over on all sides of said stampings and bracket portions, the edges of said flanges being welded together, bushings pressed through the ends of said arms, a sleeve secured on the end of said bracket portions, and a saddle around said sleeve and secured to said stampings.

11. A support arm comprising a body portion of hollow cross section, a bracket portion of hollow cross section formed on said body portion, said bracket having a generally vertical, partially cylindrical surface, a sleeve positioned in said partially cylindrical surface, a saddle member positioned around said sleeve, bracket portion, and body portion and welded thereto, a bushing passed through the upper end of said body portion, and a second bushing passed through the lower end of said body portion and through a portion of said saddle member.

12. A support arm comprising a body portion of hollow cross section, a bracket portion of hollow cross section formed on said body portion, said bracket having a generally vertical partially cylindrical surface, a sleeve positioned in said partially cylindrical surface, a saddle member positioned around said sleeve, bracket portion, and body portion and welded thereto, and a pin passed through said saddle member and intersecting said sleeve at right angles thereto.

13. A support arm comprising a body portion of hollow cross section, a bracket portion of hollow cross section formed on said body portion, said bracket having a generally vertical, partially cylindrical surface, a saddle plate positioned around said sleeve, bracket portion, and body portion and welded thereto, and a pin passed through said saddle member and intersecting said sleeve at right angles thereto, said pin not touching said bracket portion.

14. A support arm comprising a body portion of hollow cross section, a bracket portion of hollow cross section formed on said body portion, said bracket having a generally vertical partially cylindrical surface, a sleeve positioned in said partially cylindrical surface, a saddle member positioned around said sleeve, bracket portion, and body portion and welded thereto, a bushing passed through the upper end of said body portion, a second bushing passed through the lower end of said body portion and through a portion of said saddle member, and a pin passed through said saddle member and sleeve at right angles to the axis of said sleeve and offset therefrom.

15. A support arm for a parallel arm type wheel suspension comprising a stamping having a body portion, and a bracket portion extending from one side of said body portion and defining a horizontal slot, each end of said body portion defining an aperture.

16. A support arm for a parallel arm type wheel suspension comprising a stamping having a body portion, and a bracket portion extending from one side of said body portion and defining a horizontal slot, each end of said body portion defining an aperture, said stamping having its edges turned over completely therearound to form a flange.

ROSS H. PHELPS.